United States Patent [19]

Ouvrard et al.

[11] Patent Number: 5,291,934
[45] Date of Patent: Mar. 8, 1994

[54] MOTOR-DRIVEN BLIND FOR A CURVED REAR WINDOW OF A MOTOR VEHICLE

[75] Inventors: Gaston Ouvrard, Bressuire; Franck Boissonneau, Moncoutant, both of France

[73] Assignee: Farnier & Penin, Bressuire, France

[21] Appl. No.: 958,186

[22] Filed: Oct. 9, 1992

[30] Foreign Application Priority Data

Oct. 14, 1991 [FR] France .................. 91 12622

[51] Int. Cl.⁵ ............................. E06B 9/56
[52] U.S. Cl. ...................... 160/310; 160/68; 160/370.2
[58] Field of Search ........... 160/310, 370.2, 66, 160/67, 69, 72, 73, 74, 75, 78, 81, 82, DIG. 4, 68, 352; 296/97.7, 97.8, 97.4, 97.9

[56] References Cited

U.S. PATENT DOCUMENTS

| | | | |
|---|---|---|---|
| 3,074,474 | 1/1963 | Dunn | 160/310 X |
| 4,836,263 | 6/1989 | Ament | 160/370.2 X |
| 4,898,224 | 2/1990 | Woodworth | 160/310 |
| 5,033,527 | 7/1991 | Ouvrard et al. | 160/310 |
| 5,067,546 | 11/1991 | Jeuffray et al. | 160/370.2 X |
| 5,137,072 | 8/1992 | Traspadini | 160/370.2 X |

FOREIGN PATENT DOCUMENTS

| | | |
|---|---|---|
| 0240747 | 10/1987 | European Pat. Off. |
| 2588307 | 4/1987 | France |
| 2646203 | 10/1990 | France |
| 562668 | 7/1944 | United Kingdom |

*Primary Examiner*—David M. Purol
*Attorney, Agent, or Firm*—Griffin, Butler, Whisenhunt & Kurtossy

[57] ABSTRACT

A motor-driven blind for a curved back window of a motor vehicle. A winder roller has an end of a cloth fixed thereto and the other end fixed to a pull-bar. Two arms are hinged at ends to the pull-bar and hinged at the other ends to carriages slidable in slideway which is substantially parallel to the axis of the winder roller. A drive device synchronously moves the carriages, and hence the ends of the arm in opposite directions in the slideway to thereby deploy the cloth. The pull-bar is elastically deformable in a direction perpendicular to the cloth.

5 Claims, 2 Drawing Sheets

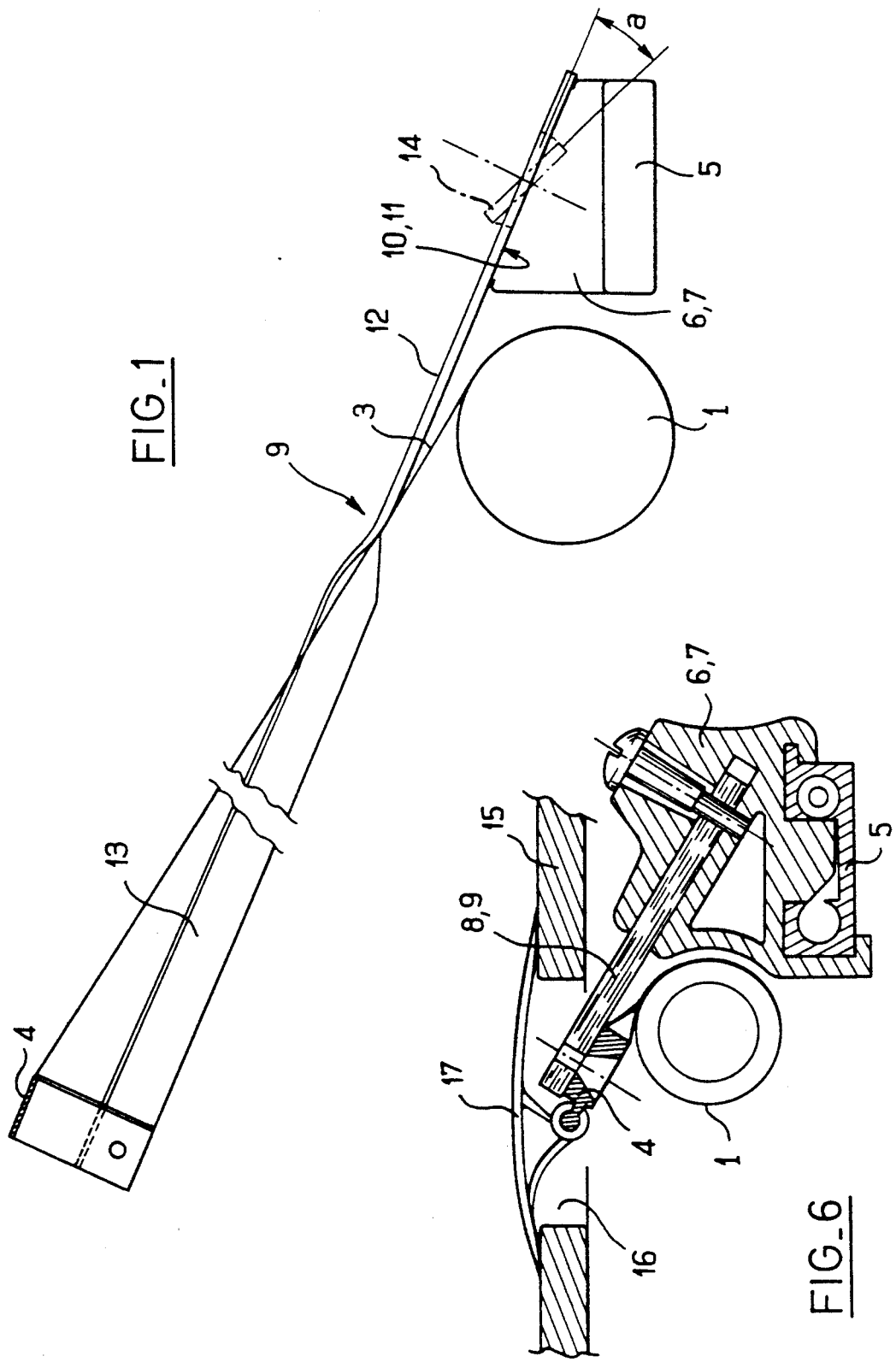

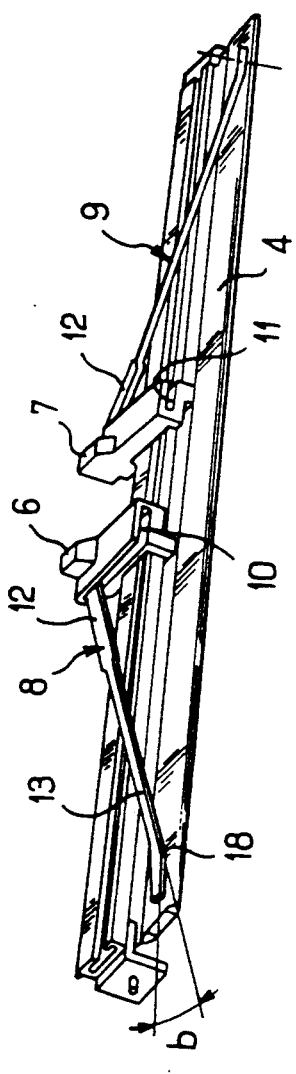
FIG._2
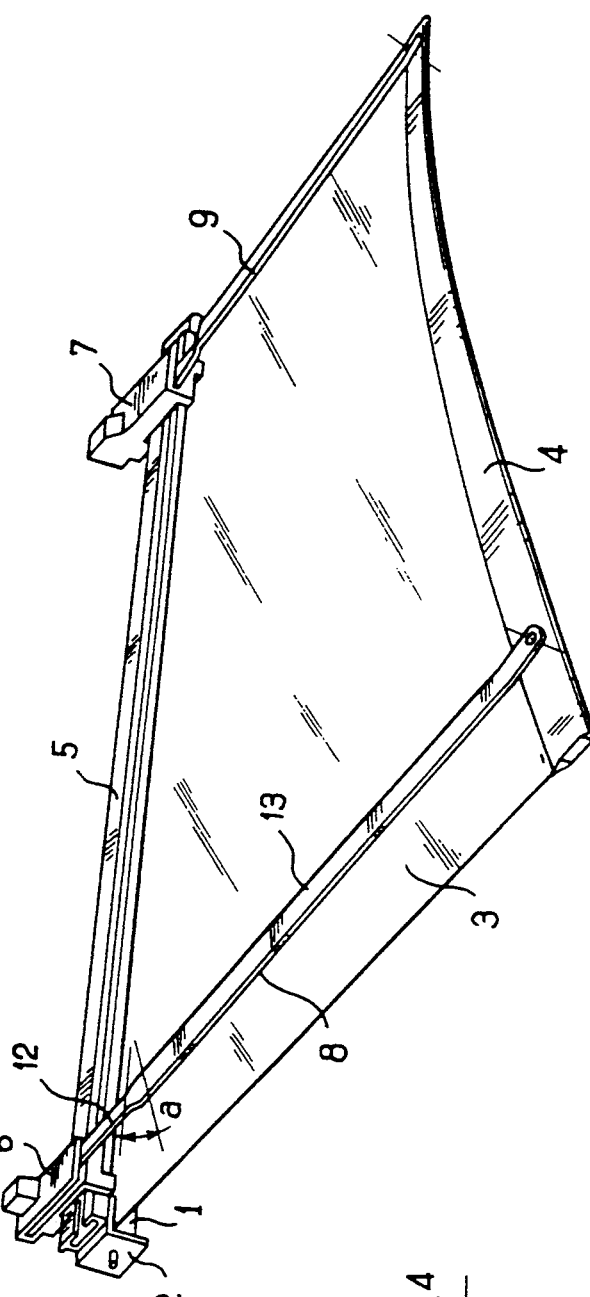
FIG._5
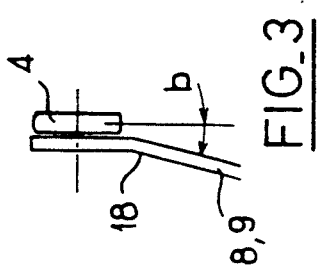
FIG._3
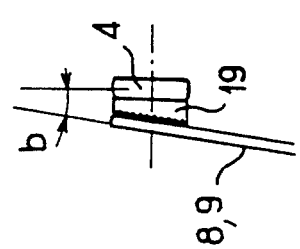
FIG._4

MOTOR-DRIVEN BLIND FOR A CURVED REAR WINDOW OF A MOTOR VEHICLE

The present invention relates to a blind having a motor-driven winder and intended for covering a window bay in particular a bay of a motor vehicle such as its rear window bay.

BACKGROUND OF THE INVENTION

Covering the rear windows of motor vehicles presents a problem that is difficult to solve given the particularly complex shape of such a window. In some vehicles, the rear window is highly sloping and curved, generally having greater curvature at the top than at the bottom. Such a bay is presently covered by means of a blind fixed beneath the rear shelf panel and deployed up to the top edge of the window, the blind then extending in a plane that covers more or less well the curved surface of the rear window. These blinds suffers from the drawback of being at a distance from said window, in particular from the base thereof, thus taking up a large area of the rear shelf panel. In addition, a window bay covered by a blind of this type is unsatisfactory in appearance.

Proposals have already been made for blinds in which the cloth is curved because of the shape of the pull-bar used for pulling the blind. The shape of the pull-bar is generally curved to coincide with the curvature at the top of the rear window which is more highly curved than the same window adjacent to the rear shelf panel. Since the winder is generally situated beneath said panel, it must be possible, particularly at the lateral ends thereof, to have sufficient room available for a curved slot that serves to accommodate the pull-bar when the blind is in its wound-in position. Such room is not always available in the rear shelf panels of some vehicles.

Finally, it is recalled that blinds of this type can be motorized in various different ways, in particular by means of deployable arms as described in Document FR-A-2 646 203.

To mitigate the drawbacks of existing blinds for the rear windows of motor vehicles, i.e., firstly they cannot be received in all vehicles and secondly they are not very satisfactory in appearance, the invention proposes a blind having a motor-driven winder for a curved window bay and suitable for being placed close to the window glass in the bay when in its deployed position, and capable of passing through a rectilinear and therefore narrow slot in a rear shelf panel beneath which the winding mechanism can be installed.

SUMMARY OF THE INVENTION

To this end, the present invention provides a blind of said type comprising:
- a support for a winder member;
- a cloth having one of its ends fixed to said winder member and having its other end fixed to a pull-bar; and
- means for deploying or retracting the cloth, said means comprising two arms each hinged at one end to the pull-bar, the other end of each arm being mounted in hinged and slidable manner relative to a slideway secured to the support and extending substantially parallel to the winding axis of the cloth, and a drive device for providing synchronized and opposite-direction drive of the sliding ends of the arms along the slideway.

According to one of the main characteristics of the invention, the pull-bar is elastically deformable perpendicularly to the cloth, each arm has a plane bearing surface of the pull-bar at its end hinged to the bar, which surface is substantially parallel to the winding axis and lies in the same plane as the corresponding surface of the other arm when the cloth is wound in, and when the cloth is unwound, it lies in a plane that intersects the winding axis and that forms a dihedral with the plane containing the corresponding surface of the other arm, the edge of said dihedral angle being substantially orthogonal to the winding axis, thereby constraining the pull-bar to bend perpendicularly to the cloth as the blind is deployed. By this disposition, the blind of the invention causes curvature to be created at the top of the cloth as the blind is deployed, the cloth having a top edge is rectilinear when it is wound up and curvilinear when it is deployed, the curvature of said edge being suitable for following closely the top curvature of the rear window that is covered by the cloth, for example.

In a simple embodiment of the invention, each arm is constituted by a flat strip that is twisted between its two ends. Each arm thus extends in two intersecting planes. The first plane is the plane in which its hinge axis is located at the slideway and is a stationary plane that constitutes the plane in which the arm swings when the blind is being deployed or retracted. The second plane in which the hinge axis of the pull-bar is disposed in each of the arms is a plane whose position varies depending on the position to which the arm is swung. Thus, when the arms are completely folded down against the bottom slideway, their free ends extend in a single plane which is parallel to the slideway and which contains the pull-bar of the blind in the rectilinear state. As the arms swing away from said position, the planes of their respective free ends tilt relative to the slideway direction so that together they define a dihedral angle that closes progressively, thereby constraining the pull-bar to curve between its hinges.

Given that the blind of the invention is generally installed beneath the rear shelf panel of a vehicle and that the pull-bar is situated level with said rear panel, the blind drive arms are not in alignment with each other when the blind is in its wound-in state. They are brought to rest in a position where they form an angle relative to each other and thus where, in theory, they impart a small amount of curvature to the pull-bar. To correct this curvature, each arm includes a compensating bend at its end that is coupled to the pull-bar. In a variant embodiment, the compensating bend may be replaced by a part constituting a wedge.

BRIEF DESCRIPTION OF THE DRAWING

An embodiment of the invention is described by way of example with reference to the accompanying drawing, in which:

FIG. 1 is a diagram for showing the structure of a blind in accordance with the invention;

FIG. 2 is a perspective diagram showing the mechanism used in a blind of the invention, the mechanism being shown in its folded position;

FIGS. 3 and 4 are fragmentary views of variant ends for the arms used in the blind of the invention;

FIG. 5 is a diagrammatic view of the mechanism when the blind is in its deployed sate; and FIG. 6 is a section view through the blind of the invention when disposed beneath the rear shelf panel of a motor vehicle.

DETAILED DESCRIPTION

The blind of the invention as shown diagrammatically in the figures comprises a winding member 1 that is known per se and is constituted by a roller mounted in a support 2. Resilient return members are disposed between the roller and the support tending to cause the roller to rotate in the direction for winding in the blind. A cloth 3 is fixed at one of its ends to the roller 1, and it is provided at its opposite end with a pull-bar 4. The pull-bar is formed by a flat bar of metal or of plastic whose width lies in the plane of the cloth so that it is highly flexible in a direction perpendicular to the cloth and very stiff in the plane of the cloth. If a plastic is used, it is advantageously a polycarbonate.

In a manner that is also known, at least in principle, the support 2 also carries a kind of slideway 5 parallel to the axis of the roller cylinder 1 and in which carriages 6 and 7 are slidably mounted. The carriages are coupled to drive members which displace them along the slideway 5 synchronously and in opposite directions. These drive means are not shown in the figures. They may be constituted, for example, by rack-cables, each of which is secured to one of the carriages and extends inside the slideway 5 along a respective side thereof such that a toothed wheel situated in the center of the slideway and meshing with the rack-cables causes them to move synchronously and in opposite directions. Other drive mechanisms giving rise to the same result could also be considered without going beyond the ambit of the invention. Each of the carriages is hinged to the bottom end of an arm 8 or 9, with the length of the arm being substantially equal to half the length of the slideway, and thus to about half the width of the cloth constituting the blind, with the top ends of said arms being hinged to the pull-bar 4.

On this known basic structure, the features of the invention are the following. Each carriage 6 and 7 has a respective bearing surface 10, 11 for the bottom of the corresponding arm during pivoting. These surfaces thus define the pivot plane for the arms and in general terms the surface direction of the blind when in its deployed state.

With reference more particularly to FIG. 1, it can be seen that each arm 8 and 9 comprises a flat strip which is twisted so as to define two main planes 12 and 13. The plane 12 is at the bottom end of each arm and it coincides with its pivot plane 10 or 11. In contrast, the plane 13 is inclined at an angle a relative to the plane 12. In FIG. 1, reference 14 shows the position of the top portion of each arm when the arms are in line with each other. This position is theoretical and it will be seen why below, but it serves to show that in this position, the planes 13 of the arms lie in the same plane, and the pull-bar 4 hinged to said planes 13 can also extend rectilinearly in said plane. In contrast, when the carriages move apart from each other and the arms tend to become perpendicular to the slideway 5, the planes of the planes 13 of the two arms no longer remain the same for both arms as it is in the plane 14, so that together the planes form a dihedral angle having an edge that extends perpendicularly to the middle of the slideway 5 (given the symmetry of arm movement), with the dihedral angle closing to its greatest extent when the arms are perpendicular to the slideway 5, and thus when the blind is deployed to a maximum extent. It will be undersold that the pull-bar is then constrained to bend into the dihedral angle so as to remain tangential to the arms because of the way it is fixed to them.

FIG. 5 shows the position taken up by the pull-bar 4.

In fact, the arms 8 and 9 are never fully folded down on the slideway 5 so as to come into alignment with each other because, as shown in FIG. 6, firstly the cloth winding roller 1 is situated in front of the slideway 5, and secondly the pull-bar 4 is stopped substantially level with the rear shelf panel 15 of a vehicle while the mechanism is disposed beneath said panel. The blind is deployed through a slot 16 in said panel 15 and the pull-bar 4 is provided with a trim fitting 17 whose main function when the blind is retracted is to close the slot 16. That is why the arms are already beginning to be deployed even when the blind is fully retracted. It will therefore be understood that the planes 13 of each of the arms never occupy a common plane 14 as would occur if the arms were brought into alignment with each other. The pull-bar is thus subjected to a small amount of stress that would cause it to start bending. To prevent such bending, the end of each arm to which the pull-bar is hinged includes compensation means for causing the ends of the planes 13 to lie in the same plane, thereby ensuring that the pull-bar 4 is rectilinear, said compensation means being constituted, for example, either by a bend 18 at the end of the arm through an angle b relative to the general direction thereof (see FIGS. 2 and 3), or else by an additional part 19 disposed between the pull-bar and the end of each of the arms in order to obtain said angle b (see FIG. 4).

It will readily be undersold that it is not a question of placing the end of each of the arms in a plane parallel to the pivot plane containing the planes 13 thereof, since under such circumstances nothing would happen to the pull-bar, but merely a question of deflecting the ends of said arms so as to ensure that they are coplanar at this specific point in blind deployment. This makes it possible for the pull-bar to remain rectilinear when it is received in the slot 16.

Lastly, a final feature of the invention relating to the fitting 17 may be observed. When the blind is deployed, this fitting enables the pull-bar to bear against the glass (e.g. of the rear window of a vehicle), thereby enabling it to match the curvature thereof accurately. So long as the fitting is made of a suitable material, it will damp contact between the pull-bar and the window glass, thereby reducing noise or excessive friction.

We claim:

1. A motorized blind for a curved bay, comprising:
   (a) an elongated cylindrical winder member for rotation about its axis;
   (b) a planar, flexible blind having an end thereof fixed to the winder member;
   (c) a pull-bar fixed to an opposite end of the blind and being elastically deformable in a direction perpendicular to the plane of the blind;
   (d) a slideway extending substantially parallel to the axis of the winder member;
   (e) first and second carriage means slidably connected to said slideway;
   (f) an arm connected at end thereof, respectively, to each of said carriage means and connected at an opposite end thereof, respectively, to the pull-bar, said opposite end having a flat bearing surface, the plane of which is (i) substantially parallel to the axis of the winder member and lying in a plane which includes the plane of the corresponding bearing surface of the other arm, when the blind is in a wound-up configuration; and (ii) which plane intersects the axis of the winder member and form s a dihedral with a plane including the plane of the corresponding bearing surface of the other arm, when the bind is in the unwound configuration, said dihedral having an edge substantially orthogonal to the axis of the winder;

whereby the pull-bar is progressively bent in a direction perpendicular to the plane of the blind as the blind is deployed and progressively relaxed as the blind is retracted; and (g) motor means for synchronously sliding the two carriage means in the slideway in opposite directions for deploying and retracting the blind.

2. A blind according to claim 1, wherein each arm is constituted by a flat strip that is twisted between its two ends.

3. A blind according to claim 2, wherein when the blind is in its folded state, the arms are not in alignment with each other, and each arm has a compensating bend at its which is coupled to the pull-bar.

4. A blind according to claim 2, wherein each arm carries a complementary compensation part at its end.

5. A blind according to claim 1, wherein the pull-bar carries a flexible trim fitting in the vicinity of its top edge.

* * * * *